US012121764B2

(12) United States Patent
Kang

(10) Patent No.: US 12,121,764 B2
(45) Date of Patent: Oct. 22, 2024

(54) FIRE EXTINGUISHING DEVICES WITH FIRE PREDICTING FUNCTION

(71) Applicant: ILSUN SYSTEM CO., LTD, Asan-si (KR)

(72) Inventor: Jeong Soo Kang, Cheonan-si (KR)

(73) Assignee: ILSUN SYSTEM CO., LTD, Asan-si (KR)

( * ) Notice: Subject to any disclaimer, the term of this patent is extended or adjusted under 35 U.S.C. 154(b) by 389 days.

(21) Appl. No.: 17/677,480

(22) Filed: Feb. 22, 2022

(65) Prior Publication Data

US 2023/0264057 A1 Aug. 24, 2023

(51) Int. Cl.
*A62C 37/14* (2006.01)
*A62C 35/10* (2006.01)
*G08B 17/04* (2006.01)

(52) U.S. Cl.
CPC .............. *A62C 37/14* (2013.01); *A62C 35/10* (2013.01); *G08B 17/04* (2013.01)

(58) Field of Classification Search
CPC ......... A62C 37/08; A62C 37/14; A62C 35/10; G08B 17/04
See application file for complete search history.

(56) References Cited

U.S. PATENT DOCUMENTS

| | | | | |
|---|---|---|---|---|
| 5,224,550 | A * | 7/1993 | Bragg .................... | A62C 31/05 169/61 |
| 5,868,205 | A * | 2/1999 | Cunningham ......... | A62C 3/006 169/65 |
| 6,047,777 | A * | 4/2000 | Eisenbeiss ........... | A62C 35/023 169/60 |
| 11,547,883 | B2 * | 1/2023 | Critchley ............... | A62C 37/11 |
| 11,883,699 | B2 * | 1/2024 | Critchley ............... | A62C 13/74 |
| 2003/0062175 | A1 * | 4/2003 | Olander ............... | G08B 29/183 169/59 |
| 2004/0194976 | A1 * | 10/2004 | Kretzschmar .......... | A62C 37/14 169/42 |
| 2022/0040515 | A1 * | 2/2022 | Critchley ............. | A62C 35/023 |

(Continued)

FOREIGN PATENT DOCUMENTS

KR 10-0773517 B1 11/2007

*Primary Examiner* — Joseph A Greenlund
(74) *Attorney, Agent, or Firm* — NKL Law; Jae Youn Kim

(57) ABSTRACT

A fire extinguishing apparatus having a fire prediction function. The fire extinguishing apparatus includes: a fire extinguishing tube container having a fire extinguishing material therein, and automatically emitting the fire extinguishing material when being exposed to surrounding fire or heat; a fire pre-sensor coupled to one side of the fire extinguishing tube container and sensing surrounding presymptoms of a fire by measuring internal pressure of the fire extinguishing tube container; and a fire monitor connected to the fire pre-sensor and generating monitoring information while collecting internal state information and external environmental information of the fire extinguishing tube container. Therefore, the fire extinguishing apparatus can measure the internal pressure of the tube container for fire extinguishing, so as to predict and detect the occurrence of a nearby fire, and provide a notification to the outside through a network, so as to perform fire-related predictive maintenance and initial response.

5 Claims, 4 Drawing Sheets

100

(56) References Cited

U.S. PATENT DOCUMENTS

| | | | | |
|---|---|---|---|---|
| 2023/0264057 | A1 * | 8/2023 | Kang | A62C 35/10<br>169/58 |
| 2024/0033552 | A1 * | 2/2024 | Botella | F17C 13/06 |
| 2024/0035602 | A1 * | 2/2024 | Olson | A62C 37/48 |

* cited by examiner

FIRE EXTINGUISHING DEVICES WITH FIRE PREDICTING FUNCTION

BACKGROUND OF THE INVENTION

Field of the Invention

The present invention relates to a fire extinguishing apparatus with a fire prediction function and, more particularly, to a fire extinguishing apparatus with a fire prediction function which is installed around a fire extinguishing target to sense presymptoms of a fire and provide an alert to the outside through a network, thereby performing predictive maintenance and an initial reaction about a fire.

Background Art

Cable ducts of electronic device panels and electrical panels that are used in main industrial facilities, such as power plants, electrical substations, and refineries, are not equipped with a fire prevention system. Instead, a fire prevention system installed in an electrical room or an electronic device room is used.

Existing systems are configured such that, when a fire occurs, a temperature sensor and a smoke sensor sense the fire situation after the fire occurs and transmit a signal to a controller, and then, an extinguishing solution of the fire prevention system is emitted to suppress the fire. Accordingly, all of fire prevention systems that are currently operated have a problem that they are not suitable for the purpose of retarding or diagnosing and predicting a fire because they are designed to prevent disasters after a fire occurs.

Meanwhile, since the fire extinguishers provided in general houses or buildings are not used in ordinary circumstances, people cannot find the locations of the fire extinguishers or have to approach the ignition point to use the fire extinguishers when a fire occurs. Therefore, there is a high possibility of injury due to toxic gas and high-temperature heat generated by the fire. Accordingly, a demand for a fire extinguishing apparatus that can immediately provide fire prevention without a user's operation when a fire occurs is increasing.

PATENT LITERATURE

Patent Documents

Patent Document 1: Korean Patent No. 10-0773517 (Oct. 30, 2007)

SUMMARY OF THE INVENTION

Accordingly, the present invention has been made to solve the above-mentioned problems occurring in the prior arts, and it is an object of the present invention to provide a fire extinguishing apparatus with a fire prediction function which is installed around a fire extinguishing target to sense presymptoms of a fire and provide an alert to the outside through a network, thereby performing predictive maintenance and an initial reaction about a fire.

It is another object of the present invention to provide a fire extinguishing apparatus with a fire prediction function that can sense presymptoms of a fire through a pressure sensor mounted on a fire extinguishing tube container before a fire occurs, thereby retarding or diagnosing and predicting a fire.

It is a further object of the present invention to provide a fire extinguishing apparatus with a fire prediction function that can measure internal pressure of the fire extinguishing tube container to sense rupture of the container, and provide an alarm about the container state to the outside, thereby performing a fire prevention operation.

To accomplish the above object, according to the present invention, there is provided a fire extinguishing apparatus with a fire prediction function including: a fire extinguishing tube container having a fire extinguishing material therein, and automatically emitting the fire extinguishing material when being exposed to surrounding fire or heat; and a fire pre-sensor coupled to one side of the fire extinguishing tube container and sensing surrounding presymptoms of a fire by measuring internal pressure of the fire extinguishing tube container.

The fire extinguishing tube container may include: a container body having a predetermined length, formed in a tube shape, and having a space therein filled with the fire extinguishing material; and covering members respectively disposed at both ends of the container, respectively to seal the container body.

The covering members may be sealing caps that are respectively fit onto both open ends of the container body to seal open portions.

When the surrounding fire of the fire extinguishing tube container directly transfers to the outer surface of the container or the surrounding heat indirectly transfers to the outer surface of the container, the fire extinguishing material may be emitted through a rupture hole that is formed in a specific region of the outer surface of the container.

The fire pre-sensor includes a pressure sensor coupled to the covering member mounted on a side of the container body, and measuring the internal pressure of the container body in real time.

The fire pre-sensor is fit on the covering member such that the pressure sensor is connected to the inside of the container body, and senses the internal pressure of the container body that expands depending on the temperature of external air around the container body.

In embodiments, the fire extinguishing apparatus further includes a fire monitor connected with the fire pre-sensor and generating monitoring information while collecting an internal state of the fire extinguishing tube container and external environmental information. The fire monitor estimates a continuous increase of the temperature of the external air around the fire extinguishing tube container, and predicts presymptoms of a fire and rupture of the fire extinguishing tube container by analyzing whether the internal pressure of the fire extinguishing tube container, which is measured in real time by the pressure sensor, changes as time goes by.

When the internal pressure of the fire extinguishing tube container increases over a specific critical value, the fire monitor calculates a variation of the internal pressure, classifies fire danger stages on the basis of the variation of the internal pressure, and provides an alert to the outside. The fire monitor generates an alarm for a manager to take measures when rupture of the fire extinguishing tube container is predicted.

The present invention can have the following effects. However, because a specific embodiment is not intended to have to include all of the following effects or only the following effects, the scope of the present invention should not be construed as being limited by the embodiment.

The fire extinguishing apparatus with a fire prediction function according to an embodiment of the present invention is installed around a fire extinguishing target to sense presymptoms of a fire and provide an alert to the outside through a network, thereby performing predictive maintenance and an initial reaction about a fire.

The fire extinguishing apparatus with a fire prediction function according to an embodiment of the present invention can sense presymptoms of a fire through a pressure sensor mounted on a fire extinguishing tube container before a fire occurs, thereby retarding or diagnosing and predicting a fire.

The fire extinguishing apparatus with a fire prediction function according to an embodiment of the present invention can measure internal pressure of the fire extinguishing tube container to sense rupture of the container, and provide an alarm about the container state to the outside, thereby performing a fire prevention operation.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
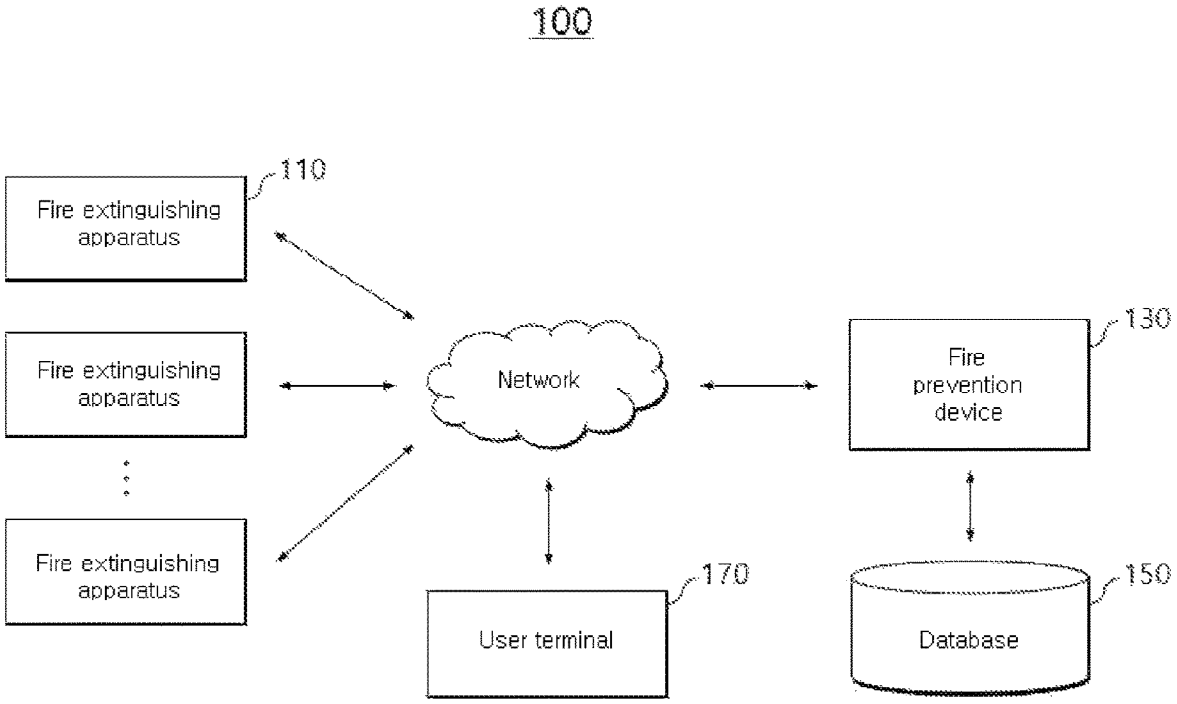
FIG. 1 is a view illustrating a fire extinguishing system with a fire prediction function according to an embodiment of the present invention.

The description in the present invention is only embodiments for structural and functional description, so the scope of a right of the present invention should not be construed as being limited by the embodiments described herein. That is, embodiments may be changed and modified in various ways, so the scope of a right of the present invention should be understood as including equivalents that can achieve the spirit of the present invention. Further, the objects or effects proposed herein do not mean that the objects or effects should be all included in a specific embodiment or only the effects should be included in a specific embodiment, so the scope of a right of the present invention should not be construed as being limited by the objects or effects.

Meanwhile, terms used herein should be understood as follows.

Terms "first", "second", etc. are provided for discriminating one component from another component and the scope of a right is not limited to the terms. For example, the first component may be named the second component, and vice versa.

It is to be understood that when one element is referred to as being "connected to" another element, it may be connected directly to another element or be connected to another element, having the other element intervening therebetween. On the other hand, it is to be understood that when one element is referred to as being "connected directly to" another element, it may be connected to or coupled to another element without the other element intervening therebetween. Meanwhile, the terms used herein to describe a relationship between elements, that is, "between", "directly between", "adjacent" or "directly adjacent" should be interpreted in the same manner as those described above.

Singular forms should be understood as including plural forms unless the context clearly indicates otherwise, and it will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

In each step, reference characters (e.g., a, b, and c) are used for convenience without determining the order of each step, and each step may occur different from the orders described herein unless specific orders are clearly described in contexts. That is, each step may occur in the order described herein, may be substantially simultaneously performed, or may be performed in a reverse order.

The present invention may be achieved as computer-readable codes in a computer-readable recording medium and the computer-readable recording medium includes all kinds of recording devices in which data that can be read out by a computer system are stored. The computer-readable recording medium, for example, may be a ROM, a RAM, a CD-ROM, a magnetic tape, a floppy disk, an optical data storage device, etc. Further, the computer-readable recording media may be distributed to computer systems that are connected through a network and may store and execute computer-readable codes in the type of distribution.

Unless otherwise defined, all terms used herein have the same meaning as commonly understood by those skilled in the art to which the present invention belongs. It will be further understood that terms defined in dictionaries that are commonly used should be interpreted as having meanings that are consistent with their meanings in the context of the relevant art and will not be interpreted in an idealized or overly formal sense unless expressly so defined herein.

FIG. 1 is a view illustrating a fire extinguishing system with a fire prediction function according to an embodiment of the present invention.

Referring to FIG. 1, a fire extinguishing system 100 with a fire prediction function may include a fire extinguishing apparatus 100, a fire prevention device 130, a database 150, and a user terminal 170.

The fire extinguishing apparatus 110 may be a device which retards a fire and performs a fire suppression action by emitting a fire extinguishing material, and may include a fire extinguishing tube container having the fire extinguishing material. The fire extinguishing apparatus 110 can monitor the state of the fire extinguishing tube container by monitoring internal pressure of the fire extinguishing tube container, and can detect a fire occurrence situation in the installation space and provide an alarm about an emergency to an external system. The fire extinguishing apparatus 110 may be connected with the fire prevention device 130 through a network, and a plurality of fire extinguishing apparatuses 110 may be connected with the fire prevention device 130 at the same time.

The fire extinguishing apparatus 110 may be installed and operated in an electrical PNL and an electronic device PNL at an industrial site, and can provide a fire extinguishing operation of automatically emitting a fire extinguishing material when temperature of the installation space reaches a specific temperature (e.g., 70 degrees) or more. The fire extinguishing apparatus 110 previously senses a danger of a fire and supports to take measures for preventing a fire in system interoperability with the fire prevention device 130, thereby securing safety of electrical facilities and improving the reliability in facility operation.

The fire prevention device 130 can recognize a danger of a fire in advance using monitoring information transmitted from the fire extinguishing apparatus 110 with a fire prediction function, and may be a server corresponding to a computer or a program which can provide relevant information to take fire prediction measures. The fire prevention device 130 can be wirelessly connected with the fire extinguishing apparatus 110 through Bluetooth, Wi-Fi, etc., and can exchange data with the fire extinguishing apparatus 110 through a network.

In an embodiment, the fire prevention device 130 can store information on fire prevention in cooperation with the database 150. Meanwhile, unlike FIG. 1, the fire prevention device 130 may include a database 150 therein. The fire prevention device 130 may include a processor, a memory, a user input/output device, and a network input/output device, and detailed description thereof will be omitted.

The database 150 may be a storage device which stores various kinds of information that are required for a fire prevention process. The database 150 can store the monitoring information received from each fire extinguishing apparatus 110 and can store information on facilities, equipment, and manpower for fire prevention. However, the database 150 is not limited thereto and can store information collected and processed in various ways in the process of the fire prevention device 130 providing fire monitoring, fire diagnosis, and fire prevention interoperating with the fire extinguishing apparatus 110.

The user terminal 170 may be a computing device which can check fire-related information, and may be a smartphone, a notebook, or a computer, but is not limited thereto and may be various devices such as a tablet PC. The user terminal 170 may be connected with the fire prevention device 130 through a network and a plurality of user terminals 170 may be connected with the fire prevention device 130 at the same time.

Meanwhile, a user can check fire prevention information related to a specific facility or an electrical facility through the user terminal 170, and check monitoring information related to fire prevention to provide information about a fire to a manager of the building or the facility.

Figure 2:
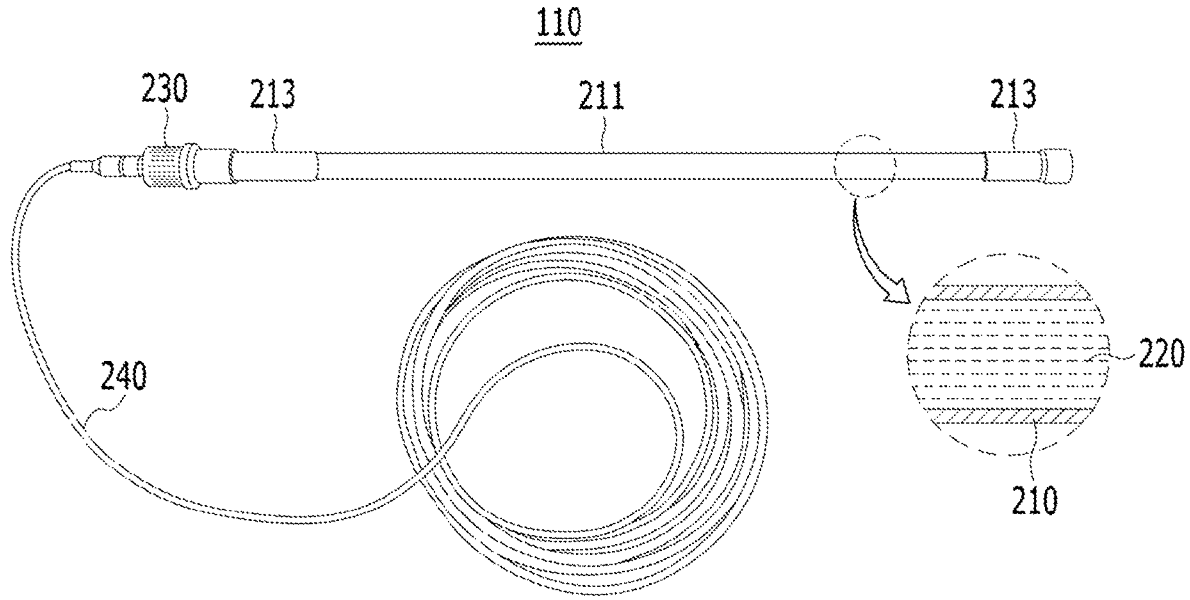
FIG. 2 is a view illustrating a fire extinguishing apparatus with a fire prediction function according to an embodiment of the present invention.

FIG. 2 is a view illustrating a fire extinguishing apparatus with a fire prediction function according to an embodiment of the present invention.

Referring to FIG. 2, the fire extinguishing apparatus 110 according to an embodiment of the present invention includes a fire extinguishing tube container 210, a fire extinguishing material 220, and a fire pre-sensor 230.

The fire extinguishing tube container 210 includes a fire extinguishing material 220 therein, and is configured to be able to automatically emit the fire extinguishing material 220 when it is exposed to surrounding fire or heat. In an embodiment, the fire extinguishing tube container 210 may include a container body 211 and covering members 213 sealing the openings at both ends of the container body 211.

The container body 211 is formed in a cylindrical shape having an accommodation space therein. The accommodation space of the container body 211 is filled with the fire extinguishing material 220. The covering member 213 is disposed at each of both ends of the container body 211 such that the container body 211 has a sealed structure.

The container body 211 may be made of plastic-based polymers, and is configured to be ruptured at a specific high temperature (over 110° C. to 130° C.) when a fire occurs such that the fire extinguishing material 220 in the accommodation space can be emitted.

The container body 211 may be formed in a tube shape, but is not limited thereto and may be formed in various shapes with various lengths, such as a stick or a hose, depending on the installation space. The container body 211 may be formed thin in about 1 mm to 2 mm thickness capable of being quickly ruptured by heat when a fire occurs.

The covering members 213 may be sealing caps which are respectively fit on both open ends of the container body 211 to seal the open portions. The covering members 213 may be configured as parts of the container 211 to naturally seal the open portions by thermally forming both ends of the container body 211 which is open. Thermal forming is performed by a specific forming apparatus such that the center of the container 211 is closed in a predetermined shape under a deformable temperature condition thereof, and the closed center portion is made smooth through a melting process. The fire pre-sensor 230 is mounted on the covering member 213.

The fire extinguishing material 220, which is in a liquid state and fills the accommodation space of the container body 211, may be an inert gas-based or halogen compound-based material, such as halon gas, nitrogen, and carbon dioxide, but is not limited thereto and may be a pure fire extinguishing agent which does not influence on the environment and on mounted electrical equipment. The fire extinguishing material 220 has a boiling point which is lower than that of common water, and expands with high pressure when temperature increases. The fire extinguishing apparatus 110 can estimate an increase of temperature of the external air as a presymptom of fire occurrence and predict fire occurrence by measuring the internal pressure of the fire extinguishing tube container 210.

The fire pre-sensor 230 is coupled to the covering member 213 disposed at one side of the container body 211 to sense presymptoms of a fire around the container body 211. The fire pre-sensor 230 may include a pressure sensor which measures the internal pressure of the container body 211. The fire pre-sensor 230 may be coupled to the covering member 213 in a connector type, and the pressure sensor for sensing the internal pressure is inserted into the covering member 213 to be connected to the accommodation space for the fire extinguishing material 220 in the container body 211. The pressure sensor is a device which senses the internal pressure of the container body 211 in proportion to temperature so as to predict presymptoms of a fire due to an increase in temperature of the external air around the container body 211.

A connection line 240 may extend from the fire pre-sensor 230 and may be connected to a fire motor. The fire pre-sensor 230 can communicate with the fire monitor and transmit fire presymptom information as well as the measured internal pressure of the fire extinguishing tube container 210 through the connection line 240.

Figure 3:
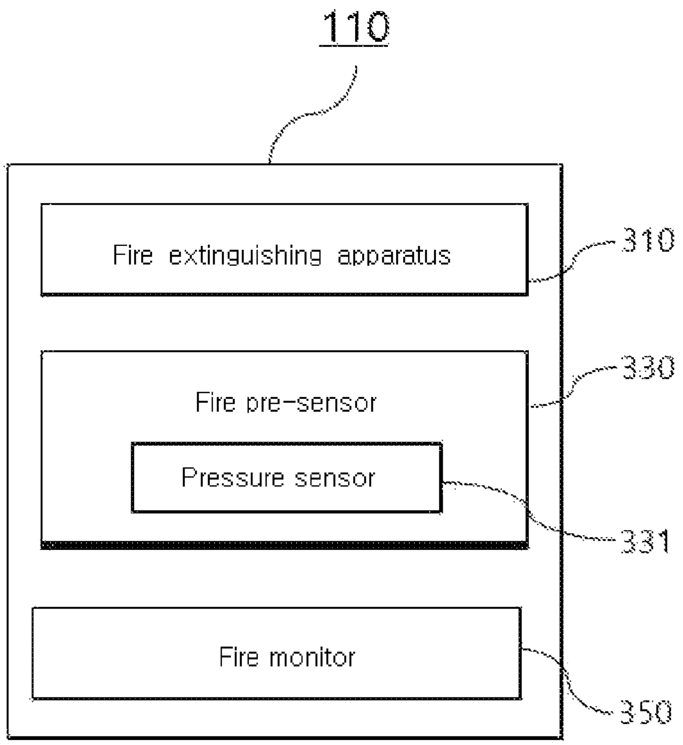
FIG. 3 is a block diagram illustrating the physical configuration of the fire extinguishing apparatus shown in FIG. 2.

FIG. 3 is a block diagram illustrating the physical configuration of the fire extinguishing apparatus shown in FIG. 1.

Referring to FIG. 3, the fire extinguishing apparatus 110 may include a fire extinguishing tube container 310, a fire pre-sensor 330, and a fire monitor 350.

The fire extinguishing tube container 310 includes a fire extinguishing material therein, and can automatically emit the fire extinguishing material when it is exposed to surrounding fire or heat. The fire extinguishing tube container 310 may be made of a material in which a rupture hole for automatically emitting the material when surrounding fire or heat increases can be formed. For instance, the fire extinguishing tube container 310 may be made of a plastic-based material. So, one side of the fire extinguishing tube container 310 can be ruptured and the material therein can be emitted out of the container by internal pressure when surrounding fire or heat increases over 70 degrees.

The fire extinguishing tube container 310 may be easily applied to a small space and may be fundamentally formed in a cylindrical shape, for the characteristics of the material, but may be easily changed to have various shapes and lengths. For example, the fire extinguishing tube container 310 may be installed in a space with a high possibility of fire occurrence, such as a panel board in a building, or may be installed after being bent at a specific portion, depending on spatial structures. The fire extinguishing tube container 310 may be installed and fixed at a rack (metal frame) of an electrical facility box, such as a panel board.

In an embodiment, the material of a specific region of the fire extinguishing tube container 310 may be made of a material different from the material of the other region to induce rupture at the specific region when a fire occurs. For instance, a middle region may be formed thinner than the other region of the fire extinguishing tube container 310 so that rupture is generated at the middle point, and a region corresponding to ⅓ or ⅔ of the entire length may be made of a material different from the material of the other region. Namely, the material and thickness of the fire extinguishing tube container 310 may be different from those of other regions in order to constantly induce a rupture point and an emission direction due to rupture.

In an embodiment, the fire extinguishing tube container 310 can emit the fire extinguishing material through a rupture hole which is formed in a specific region of the outer surface of the container when surrounding fire is directly transferred to the outer surface of the container or surrounding heat is indirectly transferred to the outer surface of the container. The fire extinguishing tube container 310 may be configured to be automatically ruptured when it is directly exposed to fire or the surrounding temperature increases over a specific temperature. Moreover, the fire extinguishing tube container 310 can induce the rupture point or the emission direction to a specific point or a specific direction by adjusting the thickness of the material according to regions or by using different materials according to regions.

The fire pre-sensor 330 is connected to the fire extinguishing tube container 310 to sense presymptoms of a fire around the installation position of the fire extinguishing apparatus 110. In an embodiment, the fire pre-sensor 330 is coupled to an end of the fire extinguishing tube container 310 to measure the internal pressure of the fire extinguishing tube container 310, and may include a pressure sensor 331. The pressure sensor 331 is connected to the inside of the fire extinguishing tube container 310 to measure pressure in the fire extinguishing tube container 310. Herein, internal pressure information means a change of the internal pressure of the fire extinguishing tube container 310 due to a change in temperature of the surrounding external air. Therefore, the internal pressure information may correspond to information on a temperature increase due to fire occurrence. That is, the internal pressure information measured by the fire pre-sensor 330 can be utilized to estimate temperature in the space where the fire extinguishing tube container 310 is installed and to predict fire occurrence in advance while the temperature continuously increases.

Meanwhile, the fire pre-sensor 330 can sense presymptoms of a fire by measuring the internal pressure of the fire extinguishing tube container 310. The fire pre-sensor 330 may include the pressure sensor 331, but is not limited thereto and may include various sensors to sense factors of presymptoms of a fire. For instance, the fire pre-sensor 330 may include a temperature sensor and a humidity sensor which can respectively measure temperature and humidity of the external air around the fire extinguishing tube container 330, a flame sensor which can sense generation of a spark, a smoke sensor which can sense smoke, etc. The fire pre-sensor 330 can serve to obtain environmental information which can be factors of presymptoms of a fire around the fire extinguishing tube container 310 by sensing the external environment, such as temperature and humidity of external air and generation of a spark and smoke together with the internal space, that is, the internal pressure of the fire extinguishing tube container 310.

The fire monitor 350 may be mounted to be spaced at a predetermined distance from the fire extinguishing tube container 310 on which the fire pre-sensor 330 is mounted, and may be connected with the fire pre-sensor 330 in a wired or wireless type. The fire monitor 350 can create monitoring information for preventing and sensing a fire while collecting the state of the fire extinguishing tube container 310 through the fire pre-sensor 330. The fire monitor 350 may include a communication module for transmitting the information collected by the fire pre-sensor 330 to an external device. The fire monitor 350 may be connected with the fire prevention device 130 through a network and can transmit monitoring information in real time or periodically.

In an embodiment, the fire monitor 350 can monitor the state of the fire extinguishing tube container 310 by controlling the operation of the pressure sensor 331 for measuring the internal pressure of the fire extinguishing tube container 310. The fire monitor 350 can sense the internal pressure of the fire extinguishing tube container 310 in real time, and provide an alarm to an external system through a network when a presymptom of a fire is sensed around the fire extinguishing tube container 310. The alarm provided to the external system may be provided in various types, such as a message, a voice, and vibration. The fire monitor 350 can store and keep the information on the internal pressure of the fire extinguishing tube container 310 in an internal memory, and detect an abnormal signal out of a normal range from the information collected in the monitoring process, and transmit relevant information to the external system.

In an embodiment, the fire monitor 350 can transmit monitoring information on the internal pressure and a variation of the internal pressure of the fire extinguishing tube container 310 by monitoring the fire extinguishing tube container 310 in real time. The fire monitor 350 can measure the internal pressure of the fire extinguishing tube container 310 and calculates the variation of the internal pressure which is a change of the internal pressure per unit time.

When the internal pressure of the fire extinguishing tube container 310 exceeds a specific critical value, the fire monitor 350 can determine it as a presymptom of a fire, calculate the variation of the internal pressure for a specific time period including the point in time, classify the danger of a fire into a warning stage, an alert stage, and a danger stage, etc., depending on variations of the internal pressure, and generate an alarm for each of the fire danger stages. In an embodiment, when the internal pressure of the fire extinguishing tube container 310 exceeds a specific critical value, the fire monitor 350 can estimate that the temperature of the external air around the fire extinguishing tube container 310 has increased. Additionally, the fire monitor 350 calculates a variation of the internal pressure during specific time periods before and after the point of time, compares the variation of the internal pressure with a reference internal pressure range of a fire-possible external air temperature, and determines the corresponding fire danger stage. For instance, the fire monitor 350 can determine a fire warning stage if the variation of the internal pressure is in the reference internal pressure range, determine a fire danger stage if the variation exceeds the reference internal pressure range, and determine a fire alert stage if the variation is under the reference internal pressure range.

In an embodiment, when the internal pressure rapidly decreases while increasing, on the basis of the variation of the internal pressure of the fire extinguishing tube container 310, the fire monitor 350 can determine is as rupture of the fire extinguishing tube container 310 and generate an alarm to inform rupture of the container. If the fire extinguishing tube container 310 is ruptured, because it can be considered as an automatic fire extinguishing state due to fire occurrence, a following fire prevention action can be performed by the external system.

Meanwhile, the fire extinguishing material contained in the fire extinguishing tube container 310 may be naturally discharged as time goes by, and accordingly, the internal pressure of the fire extinguishing tube container 310 may decrease. In this instance, because it may be required to replace or check the fire extinguishing tube container 310, the fire monitor 350 can generate an alarm to inform a manager or an inspector of this situation in advance.

Figure 4:
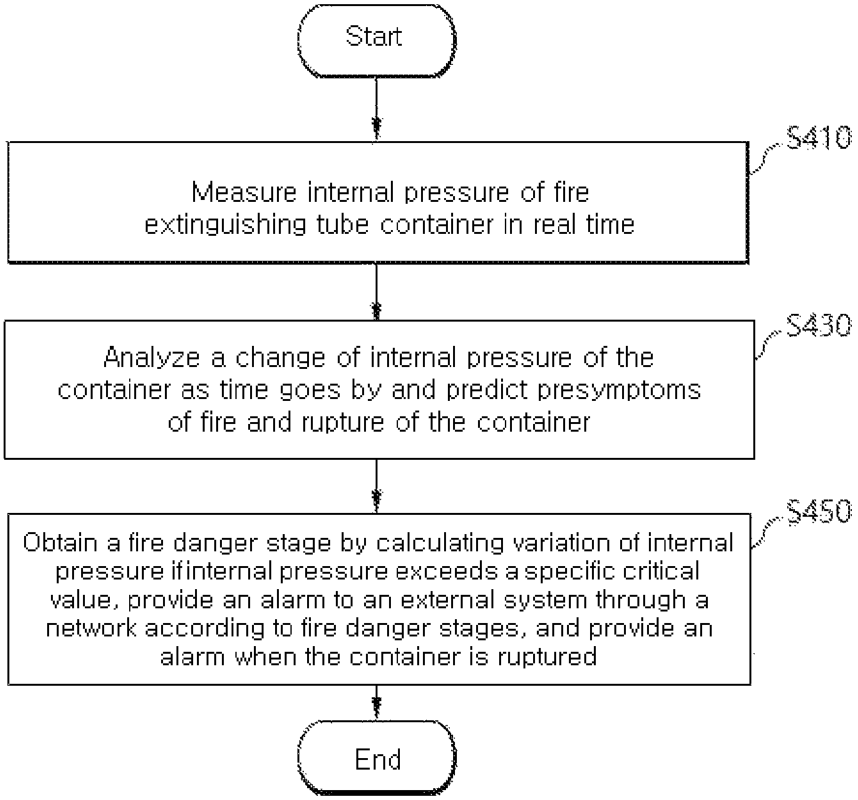
FIG. 4 is a flowchart illustrating a fire prediction operation that is performed by the fire extinguishing apparatus shown in FIG. 3.

FIG. 4 is a flow chart illustrating an example of a fire prediction operation which is performed by the fire extinguishing apparatus of FIG. 3.

Referring to FIG. 4, the fire extinguishing apparatus 110 is installed around a fire extinguishing target, senses presymptoms of a fire around the fire extinguishing tube container 310 through the fire pre-sensor 330, and is connected with an external system through the fire monitor 350 to provide an alarm. In more detail, the fire pre-sensor 330 is mounted on one side of the fire extinguishing tube container 310 to measure the internal pressure of the fire extinguishing tube container 310 in real time through the pressure sensor 331 connected to the inside of the fire extinguishing tube container 310 (Step S410).

The fire monitor 350 analyzes whether the internal pressure of the fire extinguishing tube container 310 measured in real time through the pressure sensor 331 of the fire pre-sensor 330 is changed as time goes by, estimates a continuous increase of the temperature of the external air around the fire extinguishing tube container 310, and predicts presymptoms of a fire and rupture of the fire extinguishing tube container (step S430).

When the estimated temperature of the external air exceeds a specific critical value, that is, when the internal pressure increases over a specific critical value, the fire monitor 350 calculates the variation of the internal pressure, classifies the fire danger stages on the basis of the variation of the internal pressure, and provides an alarm to the outside through a network. Further, when rupture of the fire extinguishing tube container 310 is predicted, the fire monitor 350 generates an alarm to enable a manager to take measures (step S450).

Although the present invention was described above with reference to exemplary embodiments, it should be understood that the present invention may be changed and modified in various ways by those skilled in the art, without departing from the spirit and scope of the present invention described in claims.

What is claimed is:

1. A fire extinguishing apparatus with a fire prediction function, the fire extinguishing apparatus comprising:

a fire extinguishing tube container having a fire extinguishing material therein, and automatically emitting the fire extinguishing material when being exposed to a surrounding fire or heat;

a fire pre-sensor coupled to one side of the fire extinguishing tube container and sensing surrounding presymptoms of the surrounding fire by measuring an internal pressure of the fire extinguishing tube container; and a fire monitor connected to the fire pre-sensor and generating monitoring information while collecting internal state information and external environmental information of the fire extinguishing tube container, wherein the fire pre-sensor measures the internal pressure of the fire extinguishing tube container, and the fire extinguishing tube container expands depending on a temperature of external air around the fire extinguishing tube container, in real time, and wherein the fire monitor analyzes whether the internal pressure of the fire extinguishing tube container measured through a pressure sensor in real time is changed as time goes by, estimates a continuous increase of the temperature of the external air around the fire extinguishing tube container to predict the presymptoms of the surrounding fire, calculates a variation of the internal pressure when the internal pressure of the fire extinguishing tube container increases more than a specific critical value, classifies fire stages into a fire alert stage if the variation of the internal pressure belongs to a reference internal pressure range, a fire danger stage if the variation of the internal pressure exceeds the reference internal pressure range, and a fire warning stage if the variation of the internal pressure is below the reference internal pressure range, and provides an alarm to an outside.

2. The fire extinguishing apparatus according to claim 1, wherein the fire extinguishing tube container comprises:

a container body having a predetermined length, formed in a tube shape, and having a space therein filled with the fire extinguishing material; and covers respectively disposed at both ends of the fire extinguishing tube container, respectively to seal the container body.

3. The fire extinguishing apparatus according to claim 2, wherein the covers are sealing caps that are respectively fit onto both open ends of the fire extinguishing tube container body to seal open portions.

4. The fire extinguishing apparatus according to claim 1, wherein when the surrounding fire or heat is transferred to an outer surface of the fire extinguishing tube container, the fire extinguishing material is emitted through a rupture hole that is formed in a specific region of the outer surface of the container.

5. The fire extinguishing apparatus of claim 2, wherein the fire monitor analyzes whether the internal pressure of the fire extinguishing tube container measured through the pressure sensor in real time is changed as time goes by, estimates the continuous increase of the temperature of the external air around the fire extinguishing tube container, predicts rupture of the fire extinguishing tube container when the internal pressure which is increasing is decreased suddenly, and generates an alarm.

* * * * *